United States Patent Office 2,872,839
Patented Feb. 10, 1959

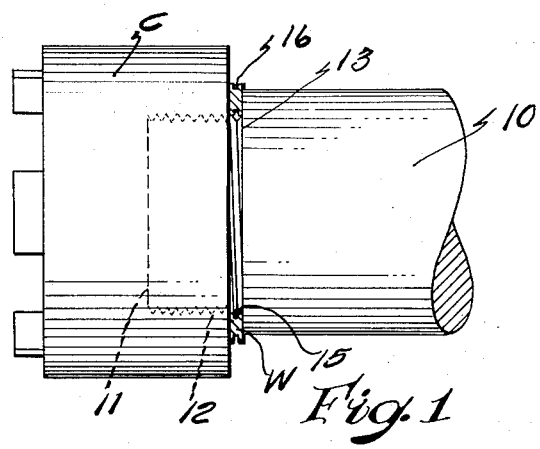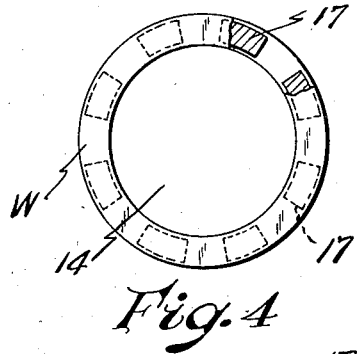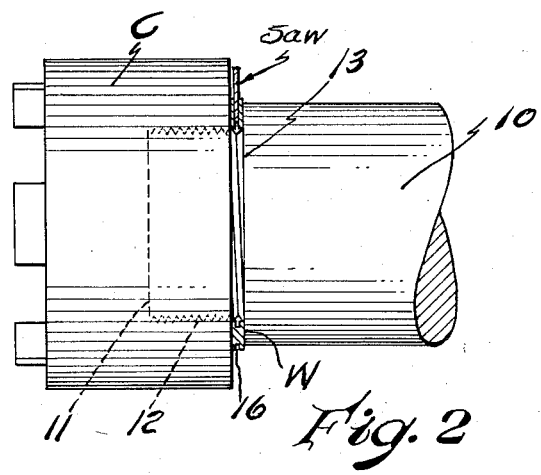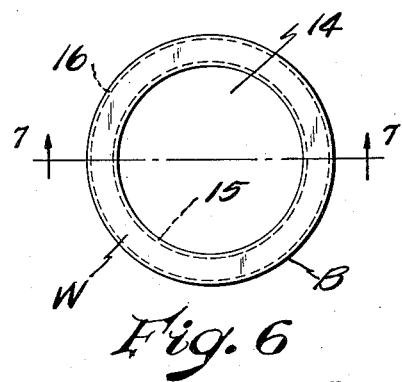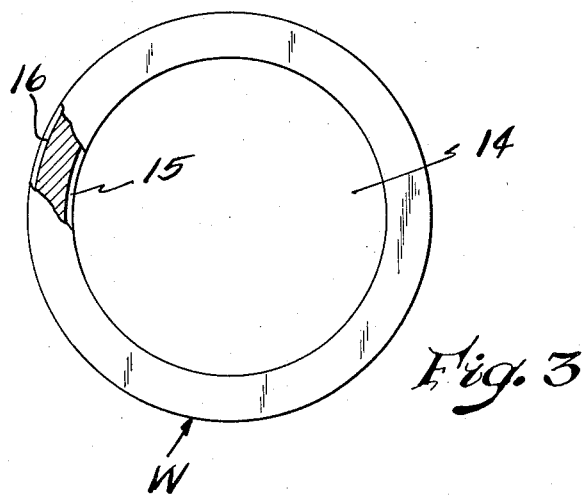

2,872,839

ANTI-FREEZE WASHER WHICH IS READILY SEPARABLE BY CUTTING TO RELIEVE A THREADED JOINT

Gorden W. Valentine, Owosso, Mich.

Application May 19, 1955, Serial No. 509,524

1 Claim. (Cl. 85—50)

This invention relates to washers used on mechanical equipment in general, and more particularly to a separable, anti-freeze washer, readily separable by cutting with a saw or similar tool for relieving the pressure of the nut or other clamping means thereagainst.

The prime object of the invention is to design a washer, either sectional or grooved, to form a saw guide and space so that the saw may be guided to divide the washer into two sections.

Another object of the invention is to design an inexpensive, anti-freeze washer, which permits chucks, nuts, etc. being tightly secured on a threaded shaft without additional clearance and from which the chuck or nut can be readily removed without strain, bending or mutilation of the parts.

Still another object is to provide a simple, practical, and relatively inexpensive washer which is usable in the conventional manner, and which can be readily manufactured and applied.

With the above and other objects in view, the present invention consists in the combination and arrangement of parts, hereinafter more fully described, illustrated in the accompanying drawing, and more particularly pointed out in the appending claim, it being understood that changes may be made in the form, size, and proportion and minor details of construction, without departing from the spirit, or sacrificing any of the advantages of the invention.

In the drawings:

Fig. 1 is a fragmentary side elevational view showing a chuck mounted on a spindle shaft with my anti-freeze washer interposed between the chuck and the shouldered section of the spindle.

Fig. 2 is a view similar to Fig. 1 showing, in section, a saw for cutting.

Fig. 3 is an enlarged face elevational view of the washer.

Fig. 4 is a face elevational view showing a modified construction.

Fig. 5 is an edge elevational view thereof.

Fig. 6 is also a face elevational view of still another modification.

Fig. 7 is a sectional elevational view taken on the line 7—7 of Fig. 6.

Referring now more particularly to the accompanying drawing, and more specifically to Figs. 1 and 2 wherein is shown a spindle 10 formed with a shouldered, threaded shaft extension 11 on which a chuck C is threaded. This chuck can be of any design desired, or a nut or other threaded device of any nature may be substituted for the chuck (not shown). This, however, is immaterial, as the instant device is directed primarily to the washer.

The chuck is internally threaded as at 12 to accommodate the shaft 11 and the washer W is mounted on the shaft and is interposed between the shoulder 13 and the one face of the chuck, said washer having a centrally disposed opening 14 of predetermined diameter to fit snugly the shaft 11 as shown in Figures 1 and 2, and is internally and circumferentially grooved as at 15.

A similar groove 16 is provided in the outer periphery of this washer and these grooves 15 and 16 extend towards one another and can be of any desired depth to provide necessary saw guide and clearance from the threaded shaft.

When it is desired to remove the chuck and it is found to be fixed firmly thereon, a great deal of strain is required to start its removal, but with the washer in position shown the mechanic merely takes a hacksaw H, places the blade in the groove 16 and saws through the washer into the groove 15, or he may drive the spindle, with the saw in the groove, until the washer has been sawed into two disk-like sections, then upon removal of the saw blade the washer will be thinner, the thickness of the saw cut, so that the chuck is readily removable.

In the modification shown in Figs. 4 and 5 of the drawing, the washer is formed of a pair of ring elements spaced from one another by radiating, connecting walls or segments 17 which also are spaced circumferentially from one another and which may be sawed through in exactly the same manner as above described.

Figs. 6 and 7 show a further modification. The washer is made up into two disk-like sections A and B, each section being turned on its inner and outer periphery as at 18, so that when placed back-to-back in intimate facial contact, these turned sections form inner and outer grooves as above described.

From the foregoing description it will be apparent that I have perfected a very simple, practical, and inexpensive washer for use with mechanical equipment of all kinds.

What I claim is:

A washer adapted to be positioned on a threaded shaft or the like to space apart a pair of normally relatively movable members mounted on the same shaft and at least one of which is threaded on said shaft, said washer comprising an annulus having flat, opposite faces and a central opening of such size as snugly to accommodate said shaft, said annulus being composed of a pair of identical rings mounted back to back and spaced from one another by segment shaped portions spaced circumferentially of said rings, said segment shaped portions having radial dimensions less than the corresponding dimensions of said rings and being so located relatively to the latter as to provide a circumferential groove at both the inner and outer periphery of said annulus, each of said grooves being of such width as to accommodate a hacksaw blade.

References Cited in the file of this patent

UNITED STATES PATENTS

| | | |
|---|---|---|
| 320,270 | Mitchell | June 16, 1885 |
| 1,148,491 | Hall | July 27, 1915 |
| 2,281,468 | Lammeren | Apr. 28, 1942 |
| 2,765,834 | Poupitch | Oct. 9, 1956 |
| 2,795,443 | Gratzmuller | June 11, 1957 |

FOREIGN PATENTS

| | | |
|---|---|---|
| 673,380 | Great Britain | June 4, 1952 |
| 708,572 | Great Britain | May 5, 1954 |